United States Patent [19]

Meuschke et al.

[11] 4,199,857
[45] Apr. 29, 1980

[54] TUBE BUNDLE REMOVAL METHOD AND APPARATUS

[75] Inventors: Robert E. Meuschke, Pittsburgh; Robert W. Beer, Murrysville, both of Pa.

[73] Assignee: Westinghouse Electric Corp., Pittsburgh, Pa.

[21] Appl. No.: 901,659

[22] Filed: May 1, 1978

[51] Int. Cl.² .............................................. B23P 19/04
[52] U.S. Cl. ..................................... 29/157.4; 29/726; 176/65; 29/426.6; 29/400 N
[58] Field of Search .............. 29/427, 426, 726, 157.4, 29/403

[56] References Cited

U.S. PATENT DOCUMENTS

| | | | |
|---|---|---|---|
| 3,857,158 | 12/1974 | Costello | 29/427 |
| 4,125,928 | 11/1978 | Cawley et al. | 29/427 X |

Primary Examiner—Milton S. Mehr
Attorney, Agent, or Firm—D. C. Abeles

[57] ABSTRACT

Method and apparatus for removing the tube bundle from a steam generator disposed in a nuclear steam power plant while preserving an environment seal between the inside of the generator and the containment vessel. The tube bundle severed from the tubesheet is withdrawn upwardly into a multi-section crane including metal cask placed over an opened upper end of the steam generator shell. Removal of the bundle-containing cask is effectuated by the plant's radius crane and the cask lowered onto a metal cover plate made secure to the bottom of the cask. By a series of manipulations by the cask and radius cranes and use of tube and wrapper cutting equipment, length sections of the tube bundle and its wrapper can be contained in respective sequentially-separated top-and-bottom covered cask length sections for removal from the containment vessel.

4 Claims, 14 Drawing Figures

FIG. 1
FIG. 2
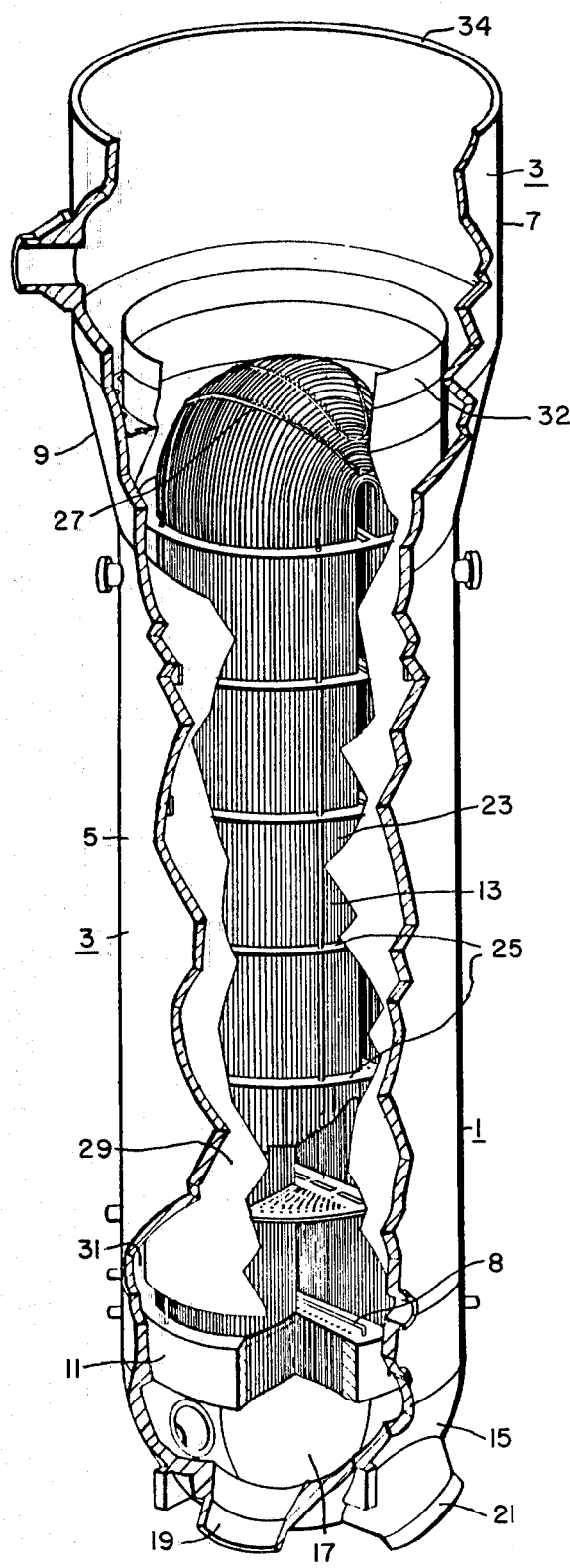
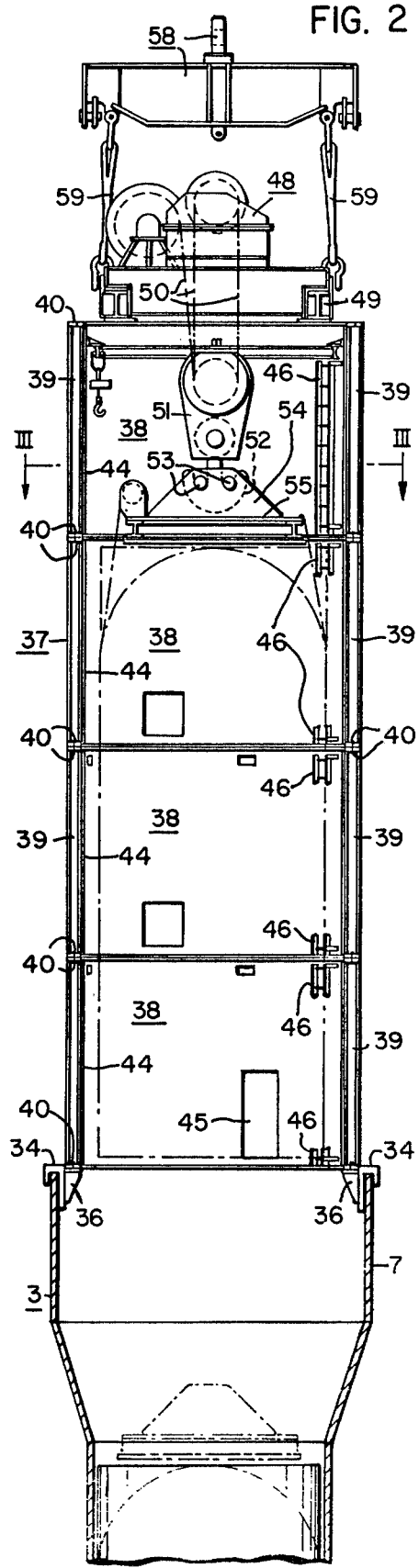

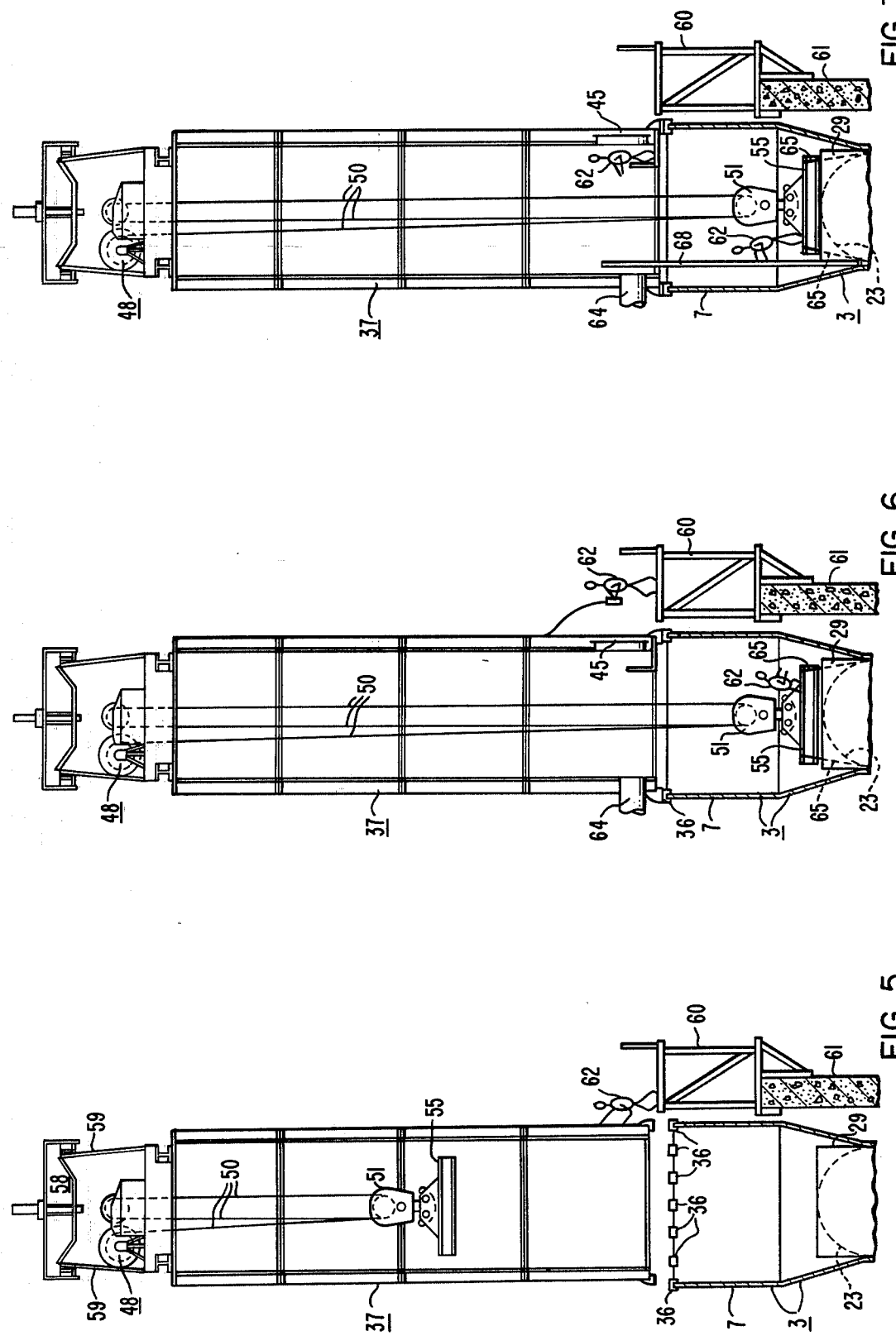

TUBE BUNDLE REMOVAL METHOD AND APPARATUS

CROSS-REFERENCE TO RELATED APPLICATIONS

Commonly assigned U.S. Application Ser. No. 809,588 filed June 24, 1977 to A. A. Massaro and H. N. Andrews; and commonly assigned U.S. Application Ser. No. 834,855, filed Sept. 14, 1977 to R. A. Blanco and A. A. Massaro.

BACKGROUND OF THE INVENTION

This invention relates to method and apparatus for effecting retubing of a steam generator in a nuclear power plant.

Nuclear reactor power plants utilized a steam generator having a tube bundle to transfer heat from a primary side reactor-heated-liquid to water on a secondary side to form steam for driving a turbine. Condenser leaks in the power plants have caused circulating water, which is often brackish, to mix with the secondary-side water in the steam generator, resulting in the buildup of undesirable chemicals in the tube bundle. Water treatment and blowdown have not completely protected the steam generator tubes from corrosion and leaks. As the number of tubes subject to such leaks increases, the desirability of replacement or repair of the steam generator increases. Since removal of a steam generator in its entirety from a nuclear power plant requires tearing out a large portion of a reinforced concrete containment vessel, replacement of such generator in its entirety becomes time consuming, expensive, and therefore undesirable.

SUMMARY OF THE INVENTION

The present invention is related in general to the replacement of the tube bundle in the steam generator in a nuclear power plant and more particularly to a method and apparatus for removing the tube bundle to be replaced while preserving an environmental seal between the inside of the generator and the containment vessel. Following separation of the vertically-extending cylindrical shell of the steam generator in a horizontal plane above the tube bundle and removal of the separated upper end of the shell together with its contents, a hollow vertically-extending cylindrical multiple-section cask assembly is lowered onto support pads atop the cut-off shell as an upward coaxial continuation thereof. By use of a crane atop the cask assembly the tube bundle, after having been severed from the tubesheet at its lower end, is raised upwardly into such cask assembly. By use of the polar or radius crane within the containment vessel of the nuclear power plant, the cask, its crane, and the tube bundle are lifted from the upper end of the shell and lowered onto a metal cover plate resting on a nearby concrete support pad or deck within the containment vessel. While on such pad, the lower cover plate is secured to the lower end of the cask, and the tube bundle is raised by the cask-top crane such that the lower end of the bundle is suspended some distance away from the cover plate. While so raised, a hole is burned through the wrapper around the suspended tube bundle by way of an access way in the cask and the tube bundle cut through along a horizontal plane at such site, for disposition of the severed tubes of the bundle within the bottom cask section with the bottom cover plate attached thereto. The lower cask section is then bolted from the next adjacent cask section above it and the remaining suspended tube bundle section together with the remaining cask sections are lifted by the radius crane away from the top of the lower cask section and onto another bottom cover member which is then secured to the lowermost end of the remaining cask sections. A top cover member is added to the top of the separated cask section containing the cut-off wrapper and tube bundle section, such cover member secured in place and the covered cask section then removed from the containment vessel. These manipulative and cutting steps are then repeated successively for the remaining cask sections until successive lengths of covered cask sections; the cable sling interconnecting the top of the tube bundle to the cask crane will then be removed from the topmost section of the tube bundle. The crane assembly will then be removed from the topmost section of the cask by use of the radius crane within the containment vessel, and the cover added to the topmost section to complete removal of the tube bundle.

Other features and advantages of the invention will become apparent from subsequent more detailed description of the invention when taken in connection with the accompanying drawings in which:

FIG. 1 of the vertical perspective view of the tube-bundle-containing portion of a nuclear power plant steam generator shown partially in section after removal of the top portion thereof;

FIG. 2 is a vertical elevation view, partly in outline and partly in section showing the apparatus of the present invention affiliated with the opened top of the shell of the tube-bundle-containing portion of the steam generator of FIG. 1;

FIGS. 5–14 show different stages of operation of the apparatus of FIG. 2 employed in performing the method of the present invention.

DESCRIPTION OF THE PREFERRED EMBODIMENT

Figure 3:
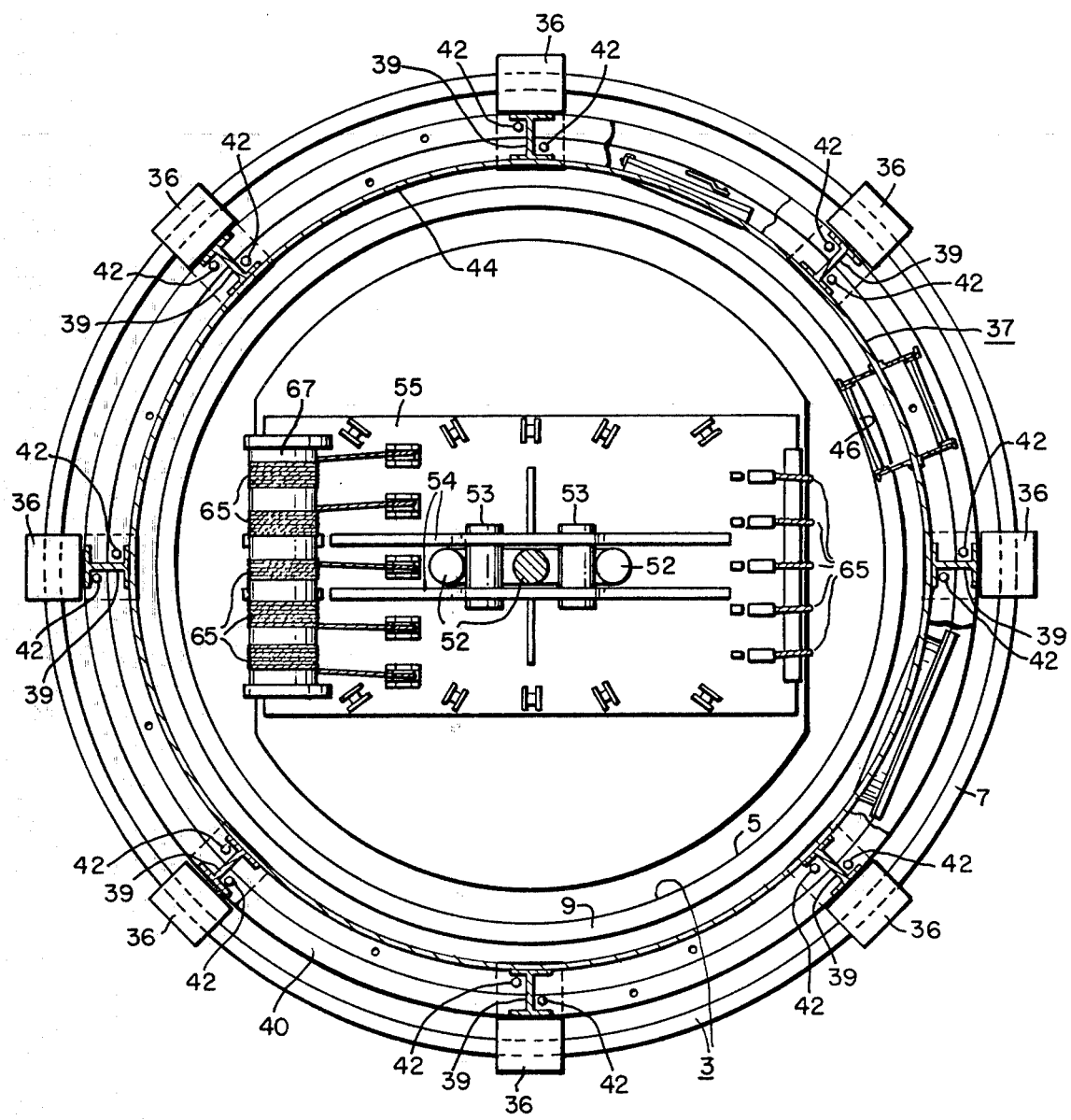
FIG. 3 is a horizontal sectional view taken along the line III—III in FIG. 2.
Figure 4:
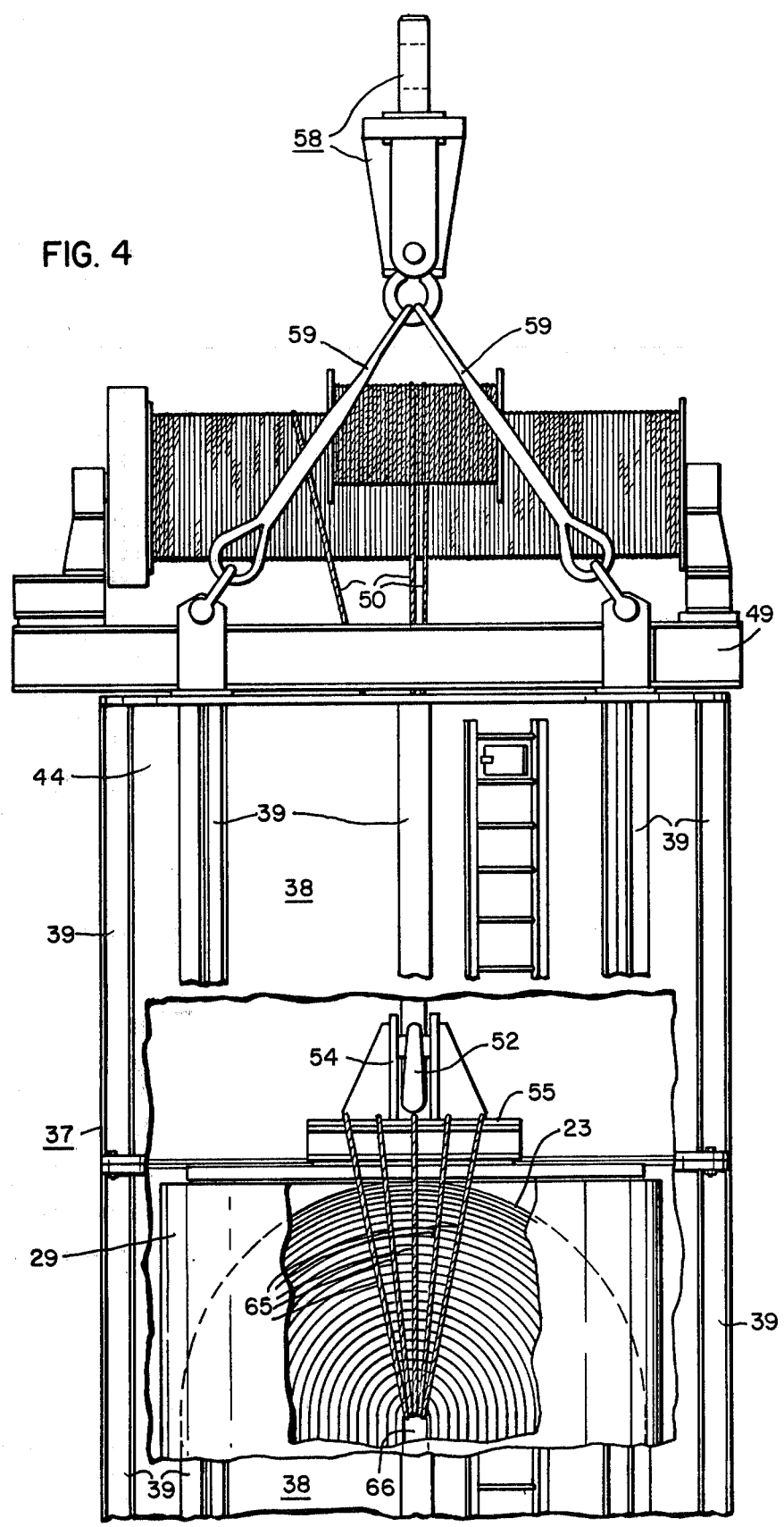
FIG. 4 is a vertical elevational view, partly in outline and partly in section, showing details of bundle-lifting-crane means embodied in the apparatus of FIG. 2.

Referring to FIG. 1 on the drawings the steam generator 1 with which the tube bundle removing apparatus of the present invention is intended to be employed typically includes a vertically oriented shell 3, the shell comprising a lower cylindrical portion 5 and an upper cylindrical portion 7, larger in diameter than the lower portion 5, and a frustoconical transition portion 9 joining the lower and upper portions 5 and 7. A tubesheet 11 is disposed in the lower end of the lower portion 5 of the shell 3 and has a plurality of holes for accommodating the ends of U-shaped tubes 13 which extend upwardly from the tubesheet 11 and are closely packed to form the tube bundle 23 disposed vertically within the lower portion 5 of the shell 3.

A hemispherically channel head 15 is fastened to the tubesheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle 23 to support the tubes 13 at various locations along their length to reduce flow-induced vibrations. Anti-vibration bars 27 are also disposed adjacent to the bends in the tubes 13 to prevent vibration in this portion of the tube bundle 23. A wrapper or sleeve 29 is disposed between the tube bundle 23 and the shell 3 so as to form an annular space 31 therebetween. The upper part of the upper section 7 of the shell has been removed to gain access to the interior of the steam generator in preparation for removal and replacement of the tube bundle therein. Various components of the steam generator usually disposed in the upper section 7 of the shell 3 also have been removed from the steam generator as shown in FIG. 1 to provide access to the top of the sleeve 39 encircling the tube bundle 23. The upper circular edge 34 of the upper portion 7 of the shell 3 will be smooth and even and rather precisely defined and will lie generally in a horizontal plane by virtue of a rather careful previous grinding, cutting, or machining operation previously referred to as preparatory to the bundle replacement while the steam generator is located in a power plant.

Typical operation of the steam generator, which per se forms no parts of the present invention, involves the flow of heated primary fluid from a nuclear reactor core upwardly through the tubesheet 11 and one branch of the U-shaped tube bundle 23 and downwardly through the other branch of such tube bundle and back through the tubesheet 11 to the discharge nozzle 21, while secondary fluid above the tubesheet 11 and outside the tube bundle 23 becomes heated for forming steam for conveyance by conduit means (not shown) to a turbine (not shown) operated by such steam.

Referring primarily to FIGS. 2-14, the present invention is brought into play by first placing a plurality of pad assemblies 36 at circumferential intervals around the upper edge 34 of the upper portion 7 of the steam generator shell 3. In accord with the exemplified embodiment of the present invention there are eight pads distributed around the periphery of the upper edge 34 and each of these pads hooked portion that fits over the upper edge and an inwardly projecting bracket portion having a horizontally extending support surface projecting inwardly of the interior of the upper section 7 of the shell 3. In accord with the present invention, by use of a radius or polar crane (not shown) a multiple section cylindrical cask assembly, initially four sections, is lowered onto the pads 36 for support thereby in extension above the upper edge of the shell section 7 coaxially therewith; a dust-excluding seal means (not shown) being present between the bottom of the cask assembly and the top of the shell.

Each section 38 of the cask assembly 37 includes a plurality of vertically extending I-beams 39, equal in number to the number of pads 36 atop the shell section 7 and distributed circumferentially about the cask section so as to occupy a rest position on the pads when the cask assembly is positioned thereon. In the cask assembly 37 the I-beams 39 of the several longitudinal sections 38 of such assembly are positioned in alignment with one another. At top and bottom of each cask section there is an annular flange 40 that extends over the tops and bottoms of the I-beams 39. The flanges 40 of adjacent cask sections 38 abut each other and are secured together by bolt means 42. Each of the cask sections 38 also includes a cylindrical wall 44 welded to the inner webs of the I-beams 39. Each cylindrical wall 44 of the several sections 38 of the cask assembly 37 are of the same diameter and form a substantially continuous cylindrical inner wall of such assembly when positioned over the top of the upper section 7 of the shell 3. Referring particularly to FIG. 2, the lowermost section 38 has a personnel hatch 45 that opens through the wall 44 to permit entry by personnel into the interior of the cask assembly. Each of the cask sections 38 has a corresponding section of ladder 46 attached to the interior thereof which is aligned with a corresponding ladder section in succession ones of the cask sections 38 to provide for access to any equipment disposed within the interior of the cask assembly from its top to its bottom.

On top of the uppermost section 38 of the cask assembly 37 is mounted a crane assembly 48 supported on a horizontal framework means coupled to the tops of the I-beams 39 of such uppermost cask section. The crane 48 is coupled by turns of a cable means 50 to a traveling block 51 having a hook 52 connected by pins 53 to an upwardly projecting bracket members 54 attached to a flat rectangular cable sling platform 55.

A lift beam and hook assembly 58 is connected by links 59 to the support structure 49 for the crane assembly 48 to provide for lifting and transporting the overall assembly including the crane means 48 and the cask assembly 37 and its contents by the overhead polar or radius crane (not shown) located within the containment vessel.

Referring to FIG. 5, by use of a work platform 60 and support means 61 therefor, working personnel 62 can assist in lowering of the cask assemblage 37 with its crane 48 onto the support pads 36. Following this the crane 48 atop the cask assembly 37 may be operated to play out the cable means 50 for lowering the traveling block 51 and the cable sling platform 55 downwardly into the upper end of the upper section 7 of the steam generator tube shell 3 into proximity with the top of the tube bundle 23 and the wrapper 29 encircling same, as shown in FIG. 6. An air ventilation duct 64 may be installed at the lower end of the cask assembly 37 for the benefit of all operating personnel therein which, by use of the cable sling platform 55 will function to effect threading of tube bundle lift cables 65 through the slot 66, FIG. 4, and under the U-shaped upper end of the tube bundle 23. By use of a ratchet-operated gripping tool (not shown) and a drum 67, FIG. 3, a live end of the tube bundle support cables may be drawn tight and secured to the sling platform 55. Other cables (not shown) may be secured to the upper end of the wrapper 29 for support independently of the tube bundle, if required.

By use of special tools 68, FIG. 7, personnel 62 within the cask assembly 37 can separate attachment of the wrapper 29 from the generator shells 3. At the same time other personnel in the lower part of the steam generator shell can effect cutoff of the tube bundle 23 free of the tubesheet 11, FIG. 1.

Figure 8:
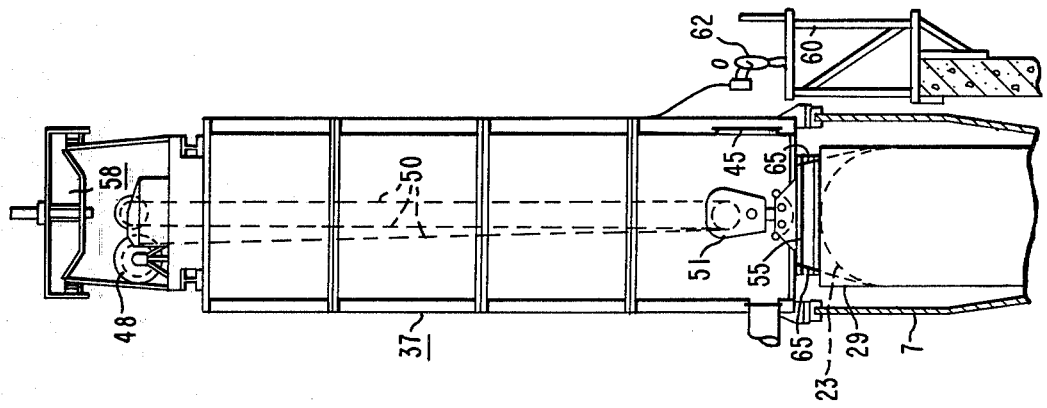
Figure 14:
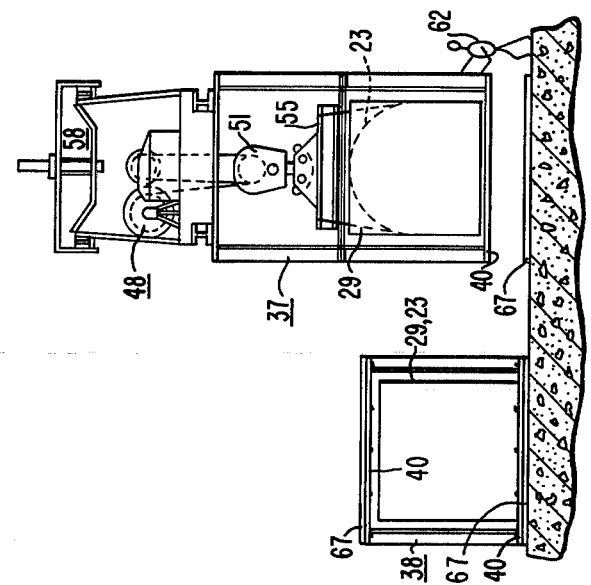

After all of the tubes of the tube bundle have been cut free of the tubesheet any operating personnel will leave the interior of the apparatus and the crane 48 will be operated to raise the wrapper 29 and tube bundle 23 upwardly into the interior of the cask assembly 37 through the medium of the cable means 50 and traveling block 51, sling platform 55, and tube bundle lifting cable 65, as shown in FIG. 8.

Figure 9:
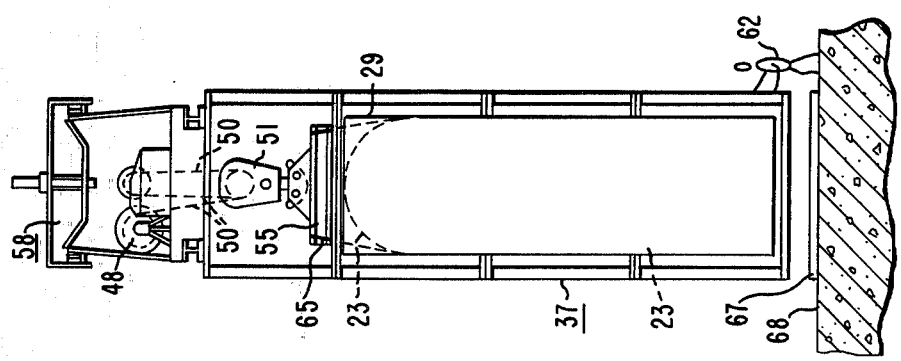

Referring to FIG. 9, by use of the hook and lift beam assembly 58 the overhead polar crane within the containment vessel will be operated to lift the crane means 48, the cask assembly 37, and the wrapper 29 together with the tube bundle 23 therein as supported by tube bundle lift cable 65, the sling platform 55, the traveling block 51, and the cable means 50. Having lifted such cask assembly and its load from the top of the uppermost section 7 of the shell 3 of the steam generator, same will be lowered onto a cover plate 67 resting on a suitable deck 68 within the containment vessel.

Figure 10:
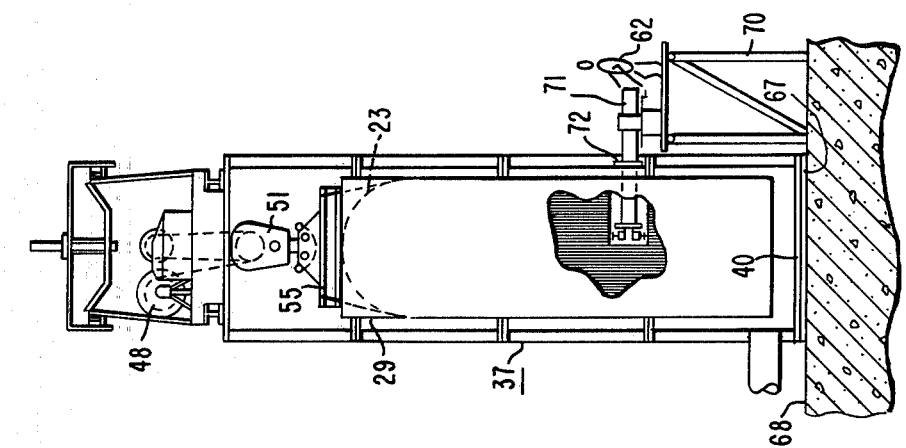

Referring to FIG. 10 the crane means 48 is operated to raise the tube bundle 23 and encircling wrapper 29 approximately 12 inches above the cover member 67 on which the cask assembly 37 rests. By use of a suitable platform 70 and suitable cutting tool 71 operating personnel 62, utilizing an axis port 72 will effect cutting of the tubes of the tube bundle at a level slightly above the upper end of the lowermost section 38 of the cask assembly 7.

Figure 11:
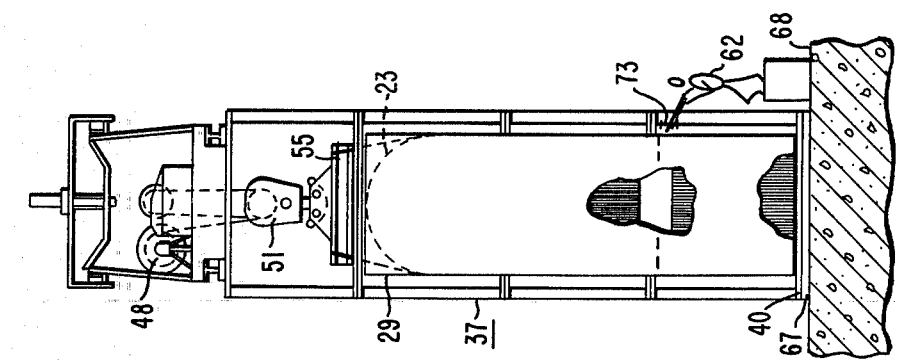

Referring to FIG. 11, by use of the crane means 48, the tube bundle 23 and wrapper 29 will be lowered to within a fraction of an inch above a cover member 67. By use of suitable hand holes 73 at the upper end of the lower section of the cask assembly 37 and rotating the assembly as required, the lower end of the wrapper may be burned free of the remainder of such wrapper as supported by the crane 48. The cover member 67 will then be bolted onto the flange 40 at the bottom of the lowermost section of the cask assembly 37, the lift crane means 48 will be operated to raise the wrapper 29 and tube bundle 23 free of separated lower ends and into the upper several sections of such cask assembly.

Figure 12:
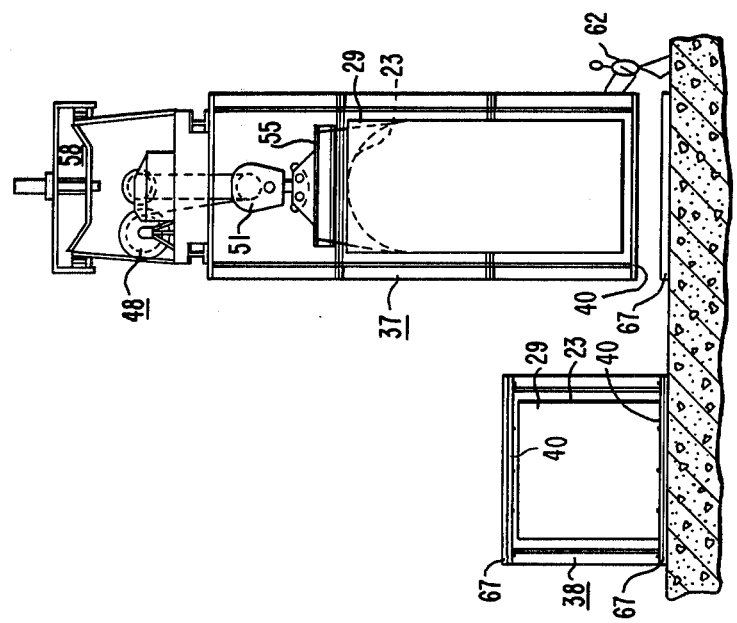

Referring to FIG. 12, by use of the radius crane (not shown) within the containment vessel and the lift beam and hook assembly 58 the crane means 48 together with the upper three sections of the cask assembly 37 and the upper ends of the severed tube bundle 23 and wrapper 29 will be lifted free of the lower section 38 of such cask assembly with the lower cut-off ends of such wrapper and tube bundle therein and lowered onto another cover member 67. A second cover member is bolted onto the top of such separated lower cask section and the entire assembly removed from the containment vessel.

Figure 13:
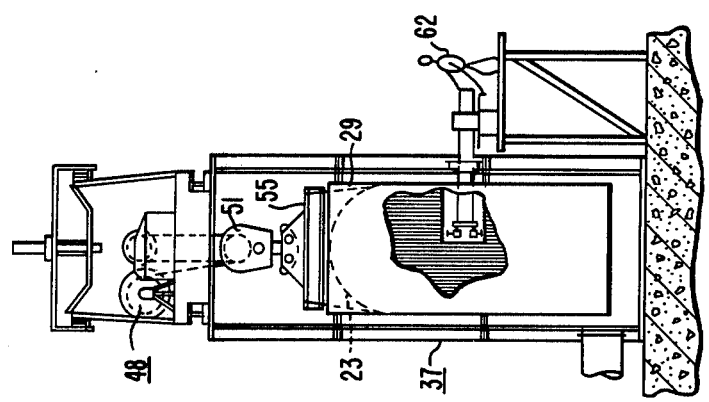

Referring to FIG. 13 the preceding steps are repeated until successive remaining several sections of the cask assembly 37 contain respective length portions of wrapper and tube bundle suitably encased in top and bottom cover members 67 bolted to the wrapper and tube bundle portion containing flask sections for removal from the containment vessel.

From the foregoing description it will be apparent that variations may be made in certain procedures, such as in cutting off the tube bundle sections at the upper end of the lower cask section, for example, without departing from the spirt and scope of the invention as defined by the following claims:

We claim:

1. Method of removal of a tube bundle from an opened-top vertical cylindrical shell of a steam generator, comprising the steps of, placing an open-bottom hollow cask assembly onto the upper open end of said shell in coaxial extension upwardly therefrom, said cask assembly being reinforced longitudinally, having a tube-bundle-lifting crane means at its upper end, and having multiple longitudinal sections interconnected by removable means, effecting coupling of said crane means to the tube bundle within said shell and lifting of such bundle into said cask assembly after such bundle has been separated from the generator's tubesheet, lifting the tube-bundle-containing cask assembly from such shell and lowering same onto a bottom cover member at a nearby support deck site, effecting cutoff of a lower portion of said tube bundle for disposition within the lowermost longitudinal section of said cask means, disconnecting and lifting the remaining tube-bundle-containing cask means free of the lowermost cask section and placing such remaining cask means on a respective bottom cover member, repeating the preceding cutoff and lifting steps until the entire tube bundle is disposed in respective longitudinal sections of said cask means, and adding top cover members to the tube-bundle-section-containing cask sections.

2. The method of claim 1, further including the steps of securing the top and bottom cover members to the respective tube-bundle-section-containing cask sections and removing same from the site.

3. The method of claim 1, including the cutoff and storage of lengths of a cylindrical wrapper encircling said tube bundle.

4. The method of claim 1, wherein the method is performed within the containment vessel of a nuclear power plant and a polar crane therein is used for lifting said cask means and its contents.

* * * * *